US008325618B2

(12) United States Patent
Goossens et al.

(10) Patent No.: US 8,325,618 B2
(45) Date of Patent: Dec. 4, 2012

(54) ELECTRONIC DEVICE, SYSTEM ON CHIP AND METHOD FOR MONITORING A DATA FLOW

(75) Inventors: Kees G. W. Goossens, Eindhoven (NL); Calin Ciordas, Eindhoven (NL); Andrei Radulescu, Eindhoven (NL)

(73) Assignee: Synopsys, Inc., Mountain View, CA (US)

( * ) Notice: Subject to any disclaimer, the term of this patent is extended or adjusted under 35 U.S.C. 154(b) by 36 days.

(21) Appl. No.: 12/307,411

(22) PCT Filed: Jul. 3, 2007

(86) PCT No.: PCT/IB2007/052595

§ 371 (c)(1), (2), (4) Date: Jul. 2, 2009

(87) PCT Pub. No.: WO2008/004188

PCT Pub. Date: Jan. 10, 2008

(65) Prior Publication Data

US 2010/0002589 A1 Jan. 7, 2010

(30) Foreign Application Priority Data

Jul. 5, 2006 (EP) .................................... 06116615

(51) Int. Cl.
*H04L 12/26* (2006.01)

(52) U.S. Cl. ....................................... 370/252; 709/224

(58) Field of Classification Search .................. 370/252, 370/253; 709/223, 224
See application file for complete search history.

(56) References Cited

U.S. PATENT DOCUMENTS

| | | | | |
|---|---|---|---|---|
| 6,859,842 | B1 | 2/2005 | Nakamichi et al. | |
| 7,136,357 | B2 | 11/2006 | Soumiya et al. | |
| 2001/0056486 | A1 | 12/2001 | Kosaka | |
| 2005/0201383 | A1* | 9/2005 | Bhandari et al. | ......... 370/395.42 |

FOREIGN PATENT DOCUMENTS

| | | | |
|---|---|---|---|
| EP | 1100233 | A2 | 5/2001 |
| EP | 1130849 | A2 | 9/2001 |
| JP | 2001-144804 | | 5/2001 |
| JP | 2001-320420 | | 11/2001 |
| JP | 2003-229890 | A | 8/2003 |
| WO | 2005059578 | | 6/2005 |

OTHER PUBLICATIONS

Ciordas, Calin, et al; "An Event-Based Network-On-Chip Monitoring Service", Proceedings, Int'l High-Level Design Validation and Test Workshop; Nov. 2004.

(Continued)

*Primary Examiner* — Pao Sinkantarakorn
(74) *Attorney, Agent, or Firm* — Fenwick & West LLP

(57) ABSTRACT

An electronic device is provided which comprises a plurality of processing units (IP1-IP6), a network-based inter-connect (N) coupled to the processing units (IP1-IP6) and at least one monitoring unit (P1, P2) for monitoring a data flow of at least one first communication path between the processing units (IP1-IP6) and for forwarding monitoring results at least temporarily via at least two separate communication paths (MC1, MC2).

11 Claims, 6 Drawing Sheets

OTHER PUBLICATIONS

Figure 1:
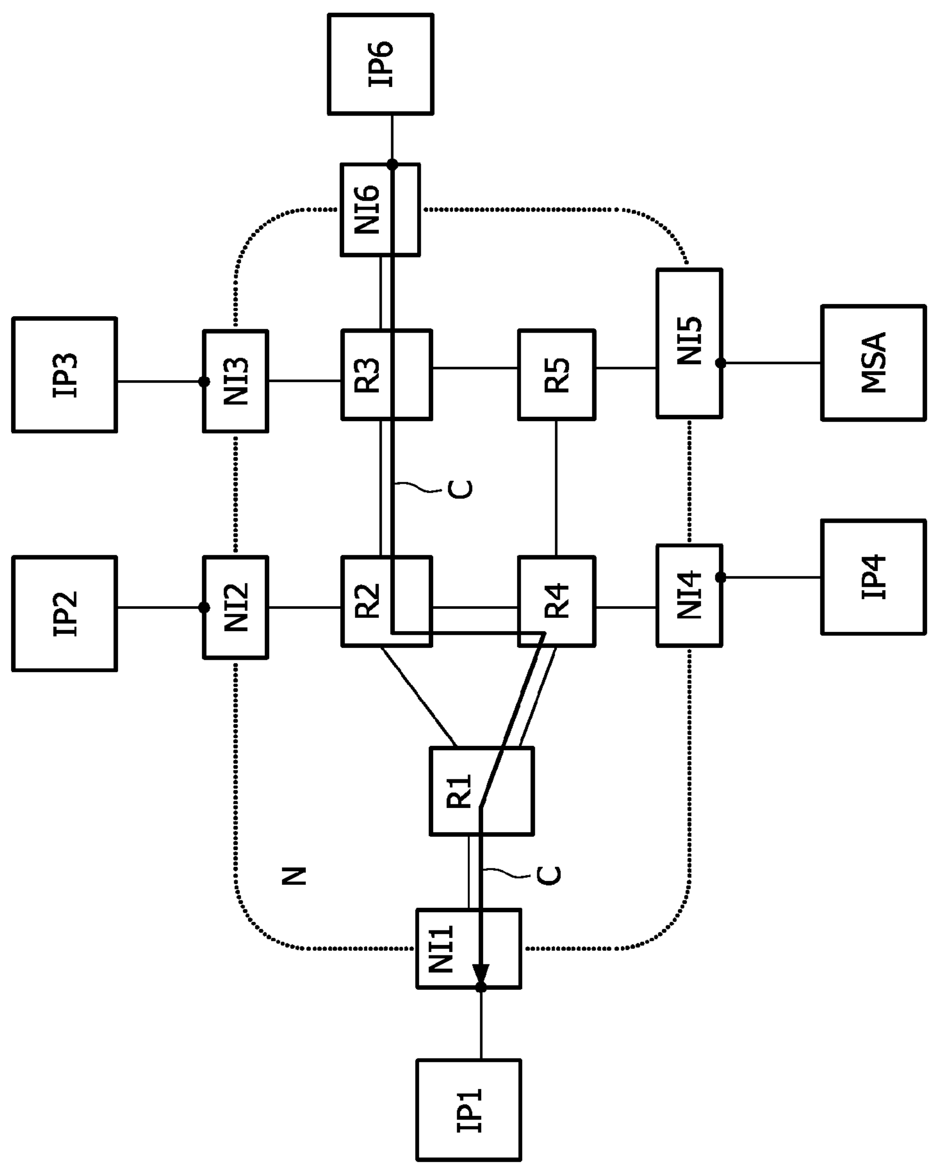

Ciordas, Calin, et al; "NOC Monitoring: Impact on the Design Flow"; Circuits and Systems, 2006. ISCAS 2006; 2006 IEEE International Symposium on KOS, Greece May 21-24, 2006; Piscataway, NJ, USA, IEEE; pp. 1981-1984; XP010938779; ISBN: 0-7803-9389-9.

Douglas, Mauro, et al; "Essential SNMP, 2nd Edition"; Sep. 1, 2005; O'Reilly; XP002459079; ISBN: 0-596-00840-6.

Doyle, Jeff; "Routing TCP/IP, vol. 1 (CCIE Professional Development)"; Sep. 28, 1998; Cisco Press; XP002459080; ISBN: 1-57870-041-8.

Leatherman, R., et al; "An Embedding Degugging Architecture for SOCS"; IEEE Potentials, vol. 24, Issue 1; Feb.-Mar. 2005.

Peterson, K., et al; "Assertion Based on Line Verification and Debug Environment for Complex Hardware Systems"; Proceedings of the 2004 International Symposium on Circuits and Systems; 2004 ISCAS '04, vol. 2, May 23-26, 2004.

Vermeulen, Bart et al; "Bringing Communication Networks on a Chip Test and Verification Implications"; IEEE Communications Magazine, vol. 41, Issue 9, Sep. 2003.

EPO, Communication pursuant to Article 94(3) EPC dated Mar. 10, 2010 for European patent application 07 789 875.7.

Chinese First Office Action, Chinese Application No. 200780025493.2, Jul. 12, 2010, 14 pages.

Chinese Second Office Action, Chinese Application No. 200780025493.2, Jul. 25, 2011, 7 pages.

European Examination Report, European Application No. 07789875.7, Apr. 16, 2009, 3 pages.

Japanese Office Action, Japanese Application No. 2009-517582, Feb. 8, 2011, 5 pages.

PCT Written Opinion, PCT Application No. PCT/IB2007/052595, Jan. 5, 2009, 5 pages.

PCT International Search Report, PCT Application No. PCT/IB2007/052595, Nov. 30, 2007, 3 pages.

Japanese Office Action, Japanese Application No. 2009-517,582, Mar. 6, 2012, 5 pages.

* cited by examiner

ELECTRONIC DEVICE, SYSTEM ON CHIP AND METHOD FOR MONITORING A DATA FLOW

FIELD OF INVENTION

The invention relates to an electronic device, system on chip and a method of monitoring a data flow.

BACKGROUND OF THE INVENTION

Networks on chips NOC proved to be scalable interconnect structures in particular for systems on chip which could become possible solutions for future on chip interconnections between so-called IP blocks, i.e. intellectual property blocks. IP blocks are usually modules on chip with a specific function like CPUs, memories, digital signal processors or the like. The IP blocks communicate with each other via the network on chip. The network on chip is typically composed of network interfaces and routers. The network interfaces serve to provide an interface between the IP block and the network on chip, i.e. they translate the information from the IP block to information which the network on chip can understand and vice versa. The routers serve to transport data from one network interface to another. For best effort communication, there is no guarantee regarding the latency of the throughput of the communication. For guaranteed throughput services, an exact value for the latency and throughput is required.

The communication within a network on chip NOC is typically packet-based, i.e. the packets are forwarded between the routers or between routers and network interfaces. A packet typically consists of a header and payload.

To monitor the data traffic via the network on chip, probes can be attached to components of the network on chip, i.e. routers and network interfaces, and may allow a debugging of data to be generated on-chip. The probes can be organized in a monitoring system as described in "An event-based network-on-chip monitoring service" by Ciordas et al., in Proc. Int'l High-Level Design Validation and Test Workshop (HLDVT), November 2004.

A sniffer probe allows (non-intrusive) an access to functional data from a network link and/or a NoC component. Sniffer probes can be arranged such that they are able to sniff from a connection passing that link. Sniffing is at least part of the data traffic required for debugging and constitutes a requirement for other debug-related components like analyzers or event-generators and data/event-filters. Data generated by sniffers is sent towards the monitoring service access point (MSA) via a debug connection. The monitoring service access point constitutes a centralized access point for the monitoring data. In order to sniff the whole traffic from a connection, the bandwidth required for the debug connection will correspond to more or less to the bandwidth of the sniffed connection.

SUMMARY OF THE INVENTION

It is therefore an object of the invention to provide an electronic device, a system on chip and a method for monitoring a data traffic which enables an efficient monitoring of the data traffic.

This object is solved by an electronic device according to claim 1, a method for monitoring a data flow according to claim 9, and a system on chip according to claim 11.

Therefore, an electronic device is provided which comprises a plurality of processing units, a network-based interconnect coupled to the processing units and at least one monitoring unit for monitoring a data flow of at least one first communication path between the processing units and for forwarding monitoring results at least temporarily via at least two separate second communication paths.

Accordingly, by forwarding the monitoring results at least temporarily via at least two separate communication paths, the monitoring traffic from the monitoring units can be divided or distributed and sent via different communication paths according to the actual traffic load of the network-based interconnect.

In a further aspect of the present invention, a first and second monitoring unit are provided which are arranged at separate locations along the path of the first communication path (claim 2). Hence, the monitoring units can be distributed along the first communication path of the processing units such that the data traffic from the monitoring units is distributed spatially in the network-based interconnect.

In a further aspect of the present invention, the monitoring units from the first and second monitoring unit are forwarded via separated second communication paths to a monitoring service access unit, where they can be analyzed accordingly, enabling a distribution of the second communication (claim 3).

In a preferred aspect of the invention, the monitoring results from the monitoring units arrive at the monitoring service access unit via different second communication paths, wherein each of the monitoring results from the different monitoring units constitute a partial monitoring result (claim 4). The combined monitoring results from each of the monitoring units constitute the overall monitoring results. Accordingly, the overall monitoring result does not need to be created from a single monitoring unit and sent via a single connection path to the monitoring service access unit but can be distributed.

The invention also relates to a system on chip which comprises a plurality of processing units, a network-based interconnect coupled to the processing units and at least one monitoring unit for monitoring a data traffic of at least one first communication path between the processing units and for forwarding monitoring results at least temporarily via at least two separate second communication paths.

The invention also relates to a method for monitoring a data flow within an electronic device having a plurality of processing units coupled by a network-based interconnect. A data traffic of at least one first communication path between the processing units is monitored, and the monitoring results are forwarded at least temporarily via at least two separate communication paths.

The invention relates to the idea that the bandwidth required for sniffing or monitoring one connection or communication is distributed over multiple lower-bandwidth debug connections or communications instead of one larger-bandwidth debug or monitor connection. In addition, multiple probes can be provided along a connection's or communication path, wherein each probe or monitor can sniff one or more connection or communication. The debug connections may share the resources of the network on chip together with the user resources. Especially if it is difficult and sometimes impossible to setup high bandwidth debug-connections in a network-on-chip NoC resource constrained environment, it is advantageous to schedule more debug connection with lower-bandwidth.

The sniffing of a high-bandwidth connection can be performed by providing multiple probes on paths of connections or communications, wherein each of the sniffers merely partly sniff the respective connection or communication.

Data is then sent over multiple connections to a central point where the complete connection trace is restored from the partial traces from the probes.

BRIEF DESCRIPTION OF THE INVENTION

These and other aspects of the invention will be apparent from and elucidated with reference to the embodiment(s) described hereinafter.

Figure 2:
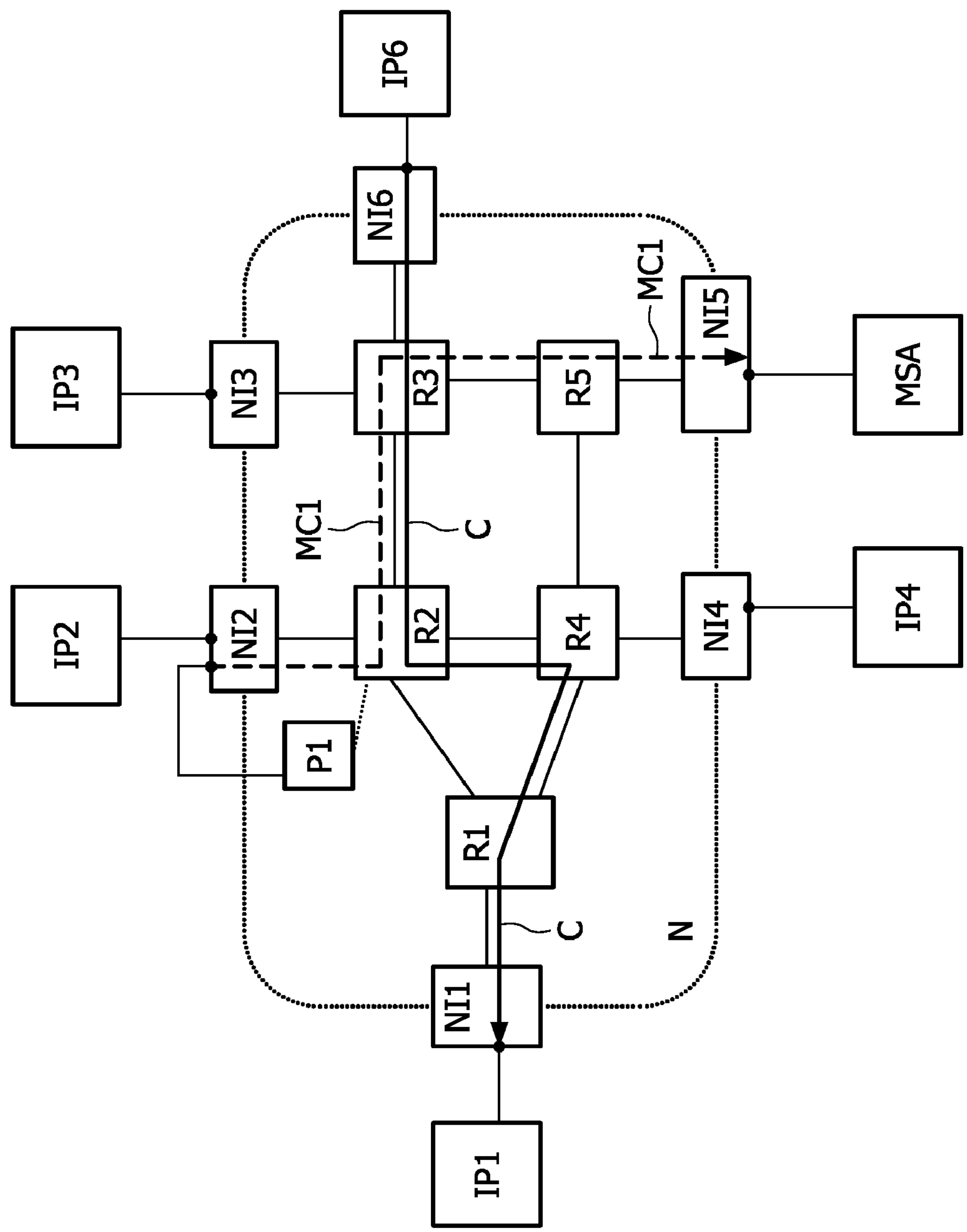
Figure 3:
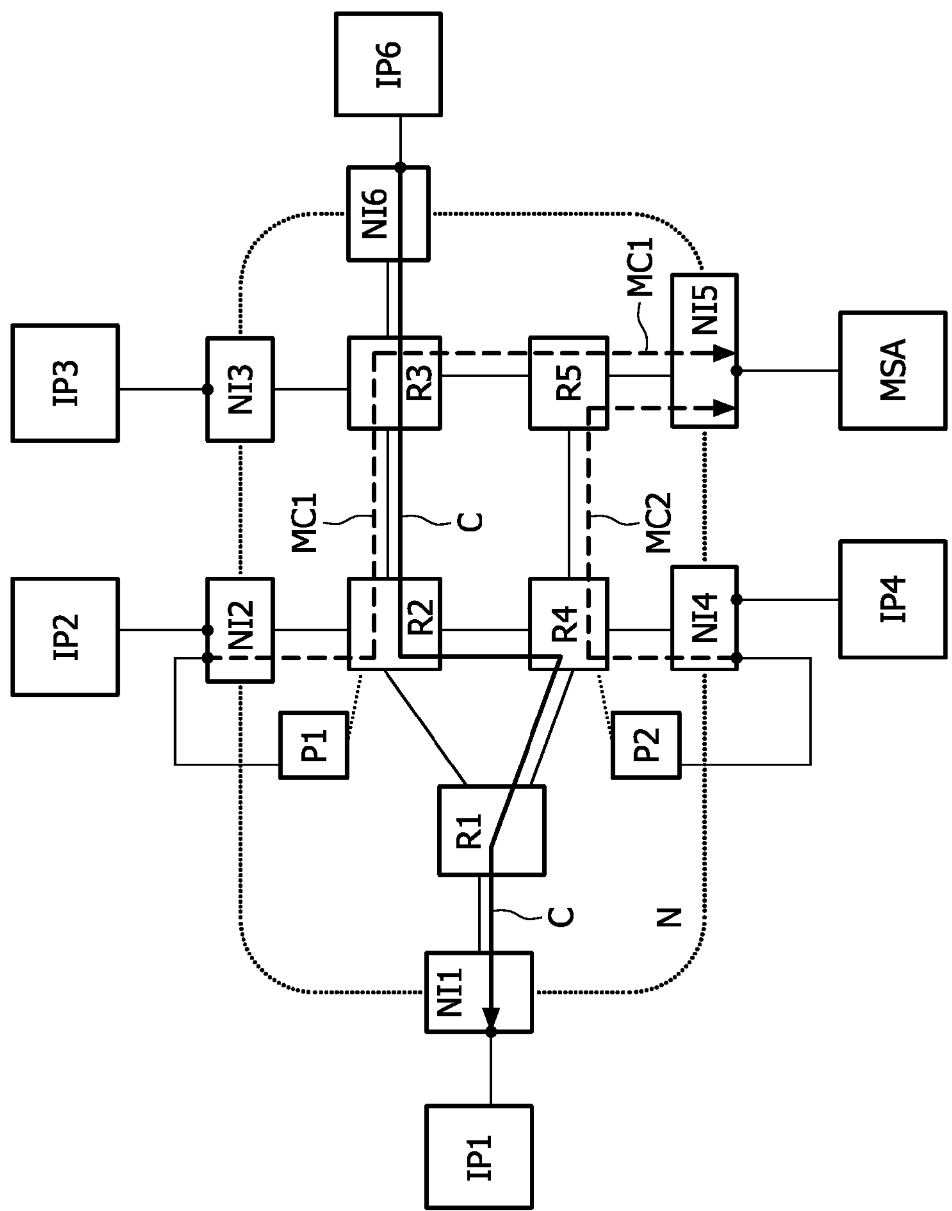
Figure 4:
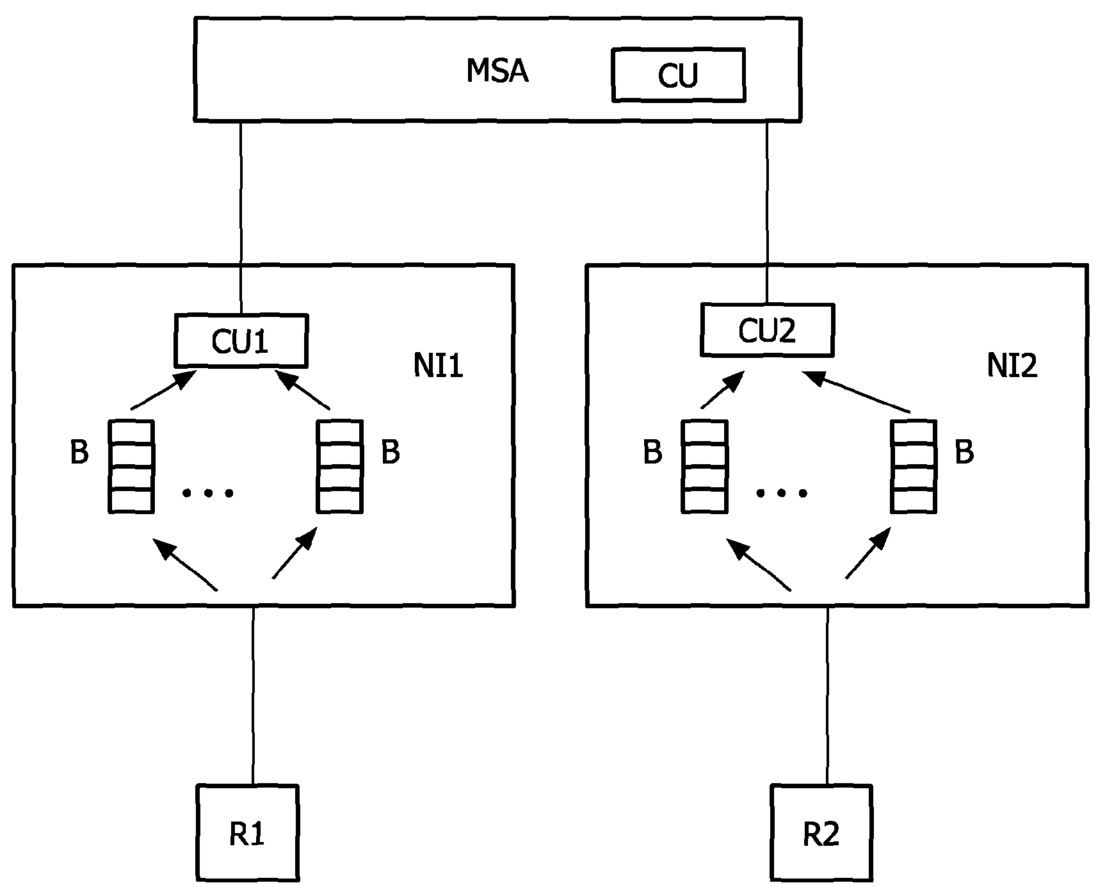
Figure 5:
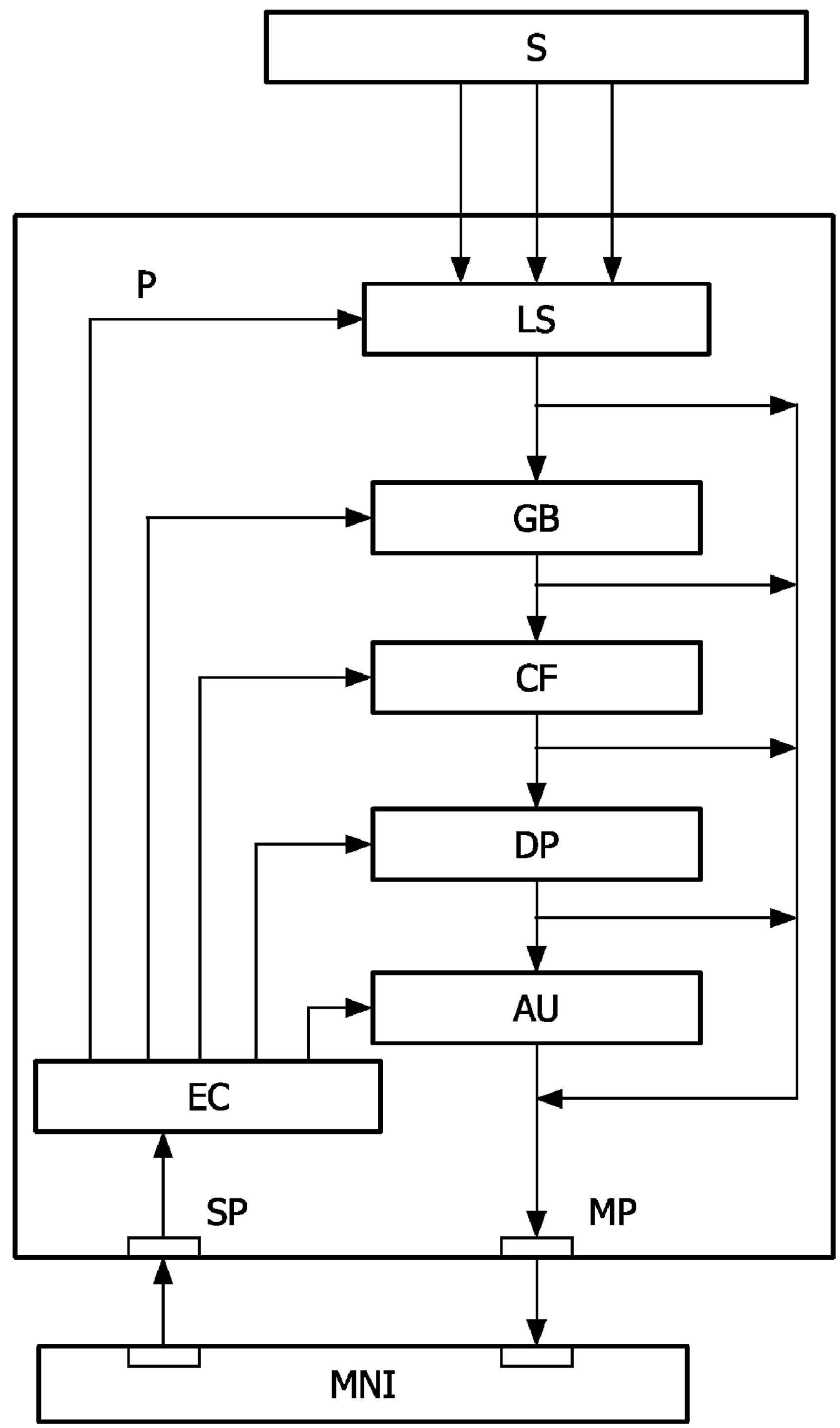
Figure 6:
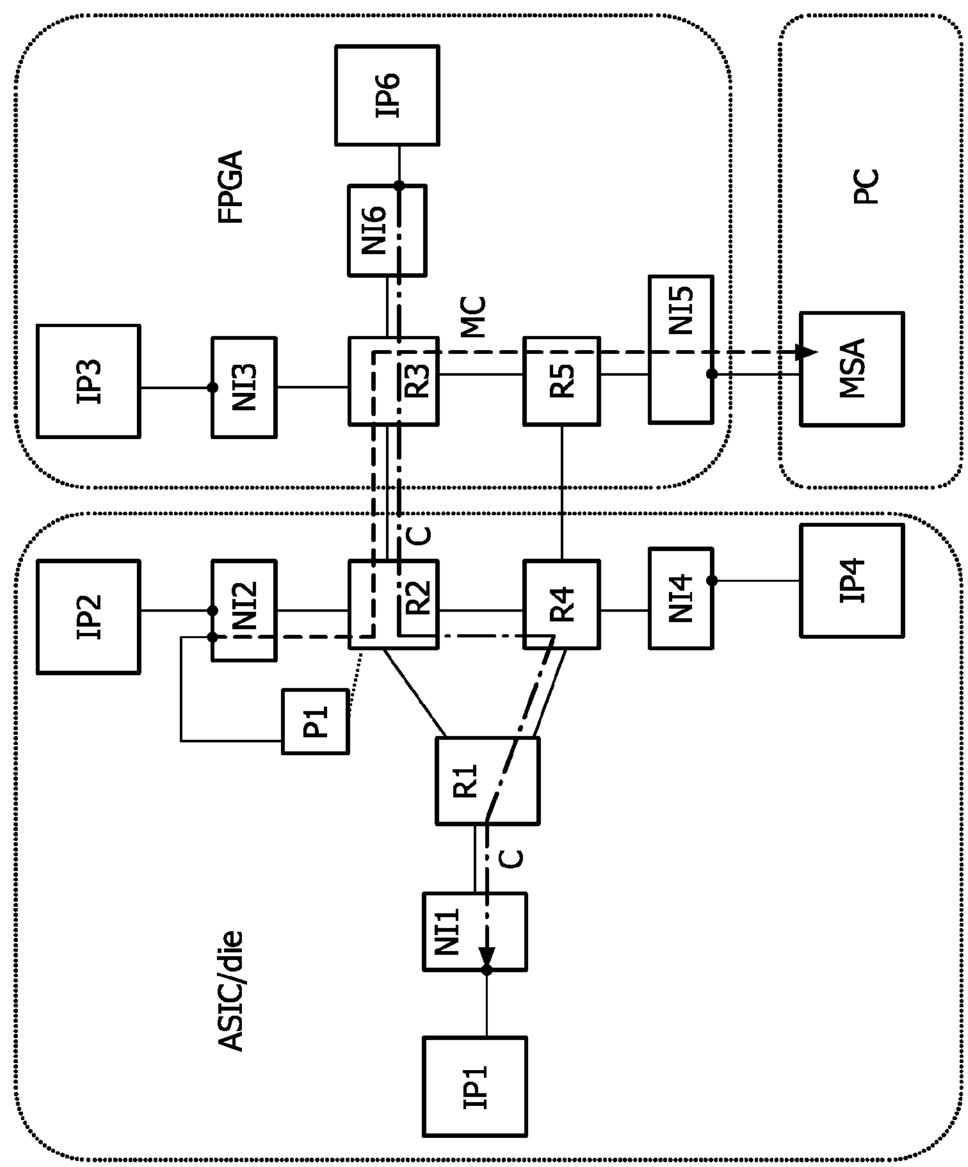

FIG. 1 shows a block diagram of a system on chip with a network-on-chip,

FIG. 2 shows a block diagram of a system on chip with a network-on-chip according to a first embodiment, FIG. 3 shows a block diagram of a system on chip with a network-on-chip according to a second embodiment, and FIG. 4 shows a schematic block diagram of part of a system on chip according to a third embodiment FIG. 5 shows a block diagram of a detailed monitoring unit according to the invention, and FIG. 6 shows a block diagram of a system on chip according to the invention.

DETAILED DESCRIPTION OF EMBODIMENTS

FIG. 1 shows a basic structure of a system on chip (or an electronic device) with a network on chip interconnect according to the invention. A plurality of IP blocks IP1-IP6 are coupled to each other via a network on chip N. The network N comprises network interfaces NI for providing an interface between the IP block IP and the network on chip N. The network on chip N furthermore comprises a plurality of routers R1-R5. The network interface NI1-NI6 serves to translate the information from the IP block to a protocol, which can be handled by the network on chip N and vice versa. The routers R serve to transport the data from one network interface NI to another. The communication between the network interfaces NI will not only depend on the number of routers R in between them, but also on the topology of the routers R. The routers R may be fully connected, connected in a 2D mesh, connected in a linear array, connected in a torus, connected in a folded torus, connected in a binary tree, in a fat-tree fashion, in a custom or irregular topology. The IP block IP can be implemented as modules on chip with a specific or dedicated function such as CPU, memory, digital signal processors or the like. Furthermore, a user connection C or a user communication path with a bandwidth of e.g. 100 MB/s between NI6 and NI1 serving for the communication of IP6 with IP1 is shown. A monitoring service access unit is provided as a central access point for monitoring the data.

The information from the IP block IP that is transferred via the network on chip N will be translated at the network interface NI into packets with potential variable length. The information from the IP block IP will typically comprises a command followed by an address and actual data to be transported over the network. The network interface NI will divide the information from the IP block IP into pieces called packets and will add a packet header to each of the packets. Such a packet header comprises extra information that allows the transmission of the data over the network (e.g. destination address or routing path and flow control information). Accordingly, each packet is divided into flits (flow control digit), which can travel through the network on chip. The flit can be seen as the smallest granularity at which control is taken place. An end-to-end flow control is necessary to ensure that data is not sent unless there is sufficient space available in the destination buffer.

The communication between the IP blocks can be based on a connection or it can be based on a connection-less communication (i.e. a non-broadcast communication, e.g. a multi-layer bus, an AXI bus, an AHB bus, a switch-based bus, a multi-chip interconnect, or multi-chip hop interconnects). The network may in fact be a collection (hierarchically arranged or otherwise) of sub-networks or sub-interconnect structures, may span over multiple dies (e.g. in a system in package) or over multiple chips (including multiple ASICs, ASSPs, and FPGAs). Moreover, if the system is being prototyped, the network may connect dies, chips (including especially FPGAs), and computers (PCs) that run prototyping & debugging software, the monitoring service access point MSA, or functional parts of the system. The interconnect for debugging data is preferably the same as the interconnect for functional, as shown in the embodiments. It may, however, also be a (partially) different interconnect (e.g. a lower speed token, ring, bus or network).

FIG. 2 shows a block diagram of a system on chip with a network-on-chip interconnect according to a first embodiment. The system on chip according to FIG. 2 substantially corresponds to the system on chip as shown in FIG. 1. The only difference is the provision of a probe P1 which is attached or coupled to the router R2. The probe is able to sniff data like flits, messages, transactions or other granularity depending how much intelligence is built in the probe. Here, as an example the probe can sniff flits. The output of the probe P1 is coupled to the network interface NI2.

The probe P1 is able to sniff all flits of the connection C when the flits pass the router R2. The sniffed flits are passed to the network interface NI2 and is forwarded to the monitoring service access unit MSA. A debug or monitor connection (or a debug communication path) MC1 from the second network interface NI2 to monitoring service access unit MSA is required in order to transport the data of the probe, i.e. the monitoring or debug data. The bandwidth BD of the debug or monitor connection MC1 is bandwidth B+a packetization overhead added by the network interface NI2, i.e. the bandwidth BD is at least of bandwidth B, e.g. BD=120 MB/s.

Although a router link, for example for AEtheral routers, may offer a raw bandwidth of 2 GB/link/s, part of this bandwidth may be already used by the existing mapping of user connections on the network on chip NOC. If the links (NI2-R2) and (R3-R5) can only allow a lower bandwidth connection than the bandwidth BD, e.g. 70 MB/s, as the rest is in use due to the existing mapping of user connections on the network on chip NoC, the sniffing cannot be performed, as the bandwidth BD cannot be offered by the network on chip NoC on any single route from the network interface NI2 to network interface NI5 (NI5 connects the MSA where the sniffed data must go).

FIG. 3 shows a block diagram of a system on chip with a network-on-chip interconnect according to a second embodiment. The system on chip according to FIG. 3 substantially corresponds to the system on chip according to FIG. 2 but comprises multiple probes e.g. all routers can be probed ensuring a full coverage of all possible connections or communication paths to be set up.

Accordingly, N probes may be present on the path of connection C. Here, a first probe P1 is attached to the router R2 and a second probe P2 is attached to the router R4. Therefore, N debug or monitor connections are required, namely a first debug or monitor connection MC1 and second debug or monitor connection MC2 with the bandwidth BMC1 and BMC2. The first debug or monitor connection MC1 is provided for the data of the first probe and the second debug or monitor connection MC2 is provided for the data of the second probe. By means of the debug or monitor connections, the data from the first and second probe are forwarded to the monitoring service access unit MSA. Thus, the bandwidth previously required for sniffing can now be shared by these N or 2 connections, i.e. BD=BMC1+BMC2, BMC1=60 MB/s, BMC2=60 MB/s. These two debug connections can be setup, if the resources are available.

As an example, each probe can sniff one flit per slot. Therefore, the probes comprise a counter, with respect to the number of flits which have passed the link. Each of the probes can alternatively sniff a number of flits either in a balanced or an imbalanced way. According to the balanced way the probes P1 and P2 sniffs the same number of flits (evenly splitting the bandwidth required), e.g. probe P1 sniffs odd flits and probe P2 sniffs the even flits), as depicted in Table 1. According to an imbalanced way the probes P1 and P2 sniffs different numbers of flits e.g. probe P2 sniffs 1 flit after probe P1 sniffs 2 flits, as depicted in Table 2.

TABLE 1

| Flit counter | P1 | P2 |
|---|---|---|
| s1 | Flit1 | — |
| s2 | — | Flit2 |
| s3 | Flit3 | — |
| s4 | — | Flit4 |
| s5 | Flit5 | — |
| s6 | — | Flit6 |

TABLE 2

| Flit counter | P1 | P2 |
|---|---|---|
| s1 | Flit1 | — |
| s2 | Flit2 | — |
| s3 | — | Flit3 |
| s4 | Flit4 | — |
| s5 | Flit5 | — |
| s6 | — | Flit6 |

The monitoring service access unit MSA reorders the flits by reading the flits according to the sniff schedule from the network interface NI connects it to the network on chip NoC, e.g. network interface NI5 in FIG. 3. The network interface NI5 requires two buffers, one for each connection (MC1 and MC2). The monitoring service access unit MSA reads in the first example 1 flit from each of the debug connections alternatively, and in the second example 2 respectively 1 flit. Hence, the entire connection activity can be reconstructed.

If more intelligence is added to the probes, the sniffing can be done per message, which is in turn reconstructed from flits. The counter will just count the number of messages passing the router.

| Msg | P1 | P2 |
|---|---|---|
| s1 | Msg1 | — |
| s2 | — | Msg2 |
| s3 | Msg3 | — |
| s4 | — | Msg4 |
| s5 | Msg5 | — |
| s6 | — | Msg6 |
| s1 | Msg1 | — |
| s2 | Msg2 | — |
| s3 | — | Msg3 |
| s4 | Msg4 | — |
| s5 | Msg5 | — |
| s6 | — | Msg6 |

Additionally or alternately, N probes may be placed onto the same connection. In this case, the bandwidth BD can be shared over N debug or monitor connections (utilizing all probes).

Additionally or alternatively, a single probe may have multiple connections with the monitoring service access unit MSA with different paths, in order to avoid a constrained link on the path from probe to the monitoring service access unit MSA.

FIG. 4 shows a schematic block diagram of part of a system on chip according to a third embodiment. Here, a first and second router, R1, R2, a first and second network interface, NI1, NI2 and a monitoring service access unit MSA are depicted. Each of the network interfaces NI1, NI2 comprises several buffers B and optionally a combine unit CU1, CU2. The combine units CU1, CU2 serve to combine the data received from the probes or monitors via the routers R1, R2. A queue or buffer B is associated with each of the monitors or probes. The combination units CU12, CU2 serve to combine the data from the queues or buffers B. Preferably, this is performed based on a schedule which may be in synchronization with the data sniffing. In addition or alternatively, the schedule can be performed in space, time or content dimensions.

The data traffic from the monitors or probes (which each may form part of the monitoring result respectively) arrive at the network interfaces NI1, NI2 such that the combination of these data (obtaining the overall monitoring result) can either be performed in the network interface or in the monitoring service access unit MSA. Alternatively or in addition, the combination may be performed in the network interfaces as well as in the monitoring service access unit MSA. However, if the combination is performed either in the network interface or in the monitoring service access unit MSA, such a combination is simple and can be easily performed.

Furthermore, one of the network interfaces NI may comprise a combination unit. Alternatively, the monitoring service access unit MSA may comprise a combination unit and may be connected to a single network interface NI.

According to a further embodiment which can be based on the first, second or third embodiment the monitors or probes P1, P2 are not only adapted to monitor or sniff a data traffic from one connection, but they are adapted to sniff or monitor a data traffic from at least two connections. For example, one monitor P1, P2 can sniff or monitor part of each of the two connections, while the other monitor may sniff or monitor the rest of the connection. Accordingly, the data traffic to be monitored from one or more connections may be monitored by a single monitor or by a plurality of monitors, wherein the plurality of monitors may perform a distributed monitoring, for example by each monitor monitoring part of the connection or by monitoring part of several connections.

FIG. 5 shows a block diagram of a detailed monitor according to the invention. The monitoring unit or the transaction monitor can be coupled to a router or network interface via a sniffer S. The sniffer will forward the data traffic which passes the associated router to the monitor M. The monitor can be coupled to a network interface MNI via which the monitor can be coupled to the network for forwarding the monitoring results of the monitor. The monitor may have several blocks which are used to filter the raw data from the sniffer. Preferably, these filtering blocks are coupled in series such that they filter the output of the preceding block. The network interface MNI of the monitor can be implemented as a separate network interface or can be merged with existing network interfaces.

The monitor can sniff all router links. A link selection unit LS will select at least one link which is to be further analyzed. An enable/configuration unit EC can be provided for enabling and configuring the monitor. The monitor may have two ports, namely a slave port SP through which the monitor can be programmed. The second port can be implemented as a master port MP for sending the result of the monitoring to a monitoring service access point MSA via the network interface.

The link selection unit LS serves to filter the data traffic from the selected link, in particular all flits passing on the selected links are forwarded to the next filtering block. By filtering the data from the sniffer, the amount of data traffic which is to be processed by the next filtering block is reduced. In the next filtering block GB, the guaranteed throughput GT or best effort BE traffic can be filtered which will also lead to a reduction of the data traffic which still needs to be monitored and processed. A connection filtering unit CF identifies at least one selected connection for example by means of the queue identifier and the path which may uniquely identify each connection. If destination routing is used, the connection can be filtered based on the destination address (and the connection queue identifier if this is not part of the destination identifier).

Other embodiments achieving the same purpose are also possible. This can for example be programmed by the slave port SP. As the queue identifier and the path can be part of the header of the packets, this can easily be identified by the connection filtering unit CF. To identify the messages which are part of the data traffic, the packets of the selected connection need to be depacketized such that the payload thereof can be examined for any relevant messages. This is preferably performed in the depacketization unit DP. The result of this depacketization can be forwarded to an abstraction unit AU where the messages are monitored and examined to determine whether an event has taken place. The depacketization unit DP and the abstraction unit AU may be combined or separate depending on the (in)dependence of the transport and network protocols and their encoding in the packet & message headers. The respective event can be programmed by the slave port SP and the enable/configuration block.

FIG. 6 shows a block diagram of a system on chip according to the invention. The components of system according to FIG. 6 corresponds the components of the system on chip according to FIG. 2. However, part of the components (IP1-IP2, NI1, NI2, NI4, R1, R2, R4) are arranged on an ASIC die, while other parts (IP3, IP6, NI3, NI6, NI5, R3, R5) are arranged on a FPGA or a personal computer PC, i.e. the monitoring service access point MSA. Although the components of the system are distributed other several independent parts, the overall operation is not changed as compared to the first, second or third embodiment.

The principles of the invention are relevant for aggregation of any low-bandwidth GT connections (debug, functional data, performance analysis, resource management, network management) with the same destination, which do not necessitate the minimum requirements of the atomic unit of bandwidth reservation.

The principles of the invention can be used in any interconnect, e.g. networks on chip, networks spanning multiple/single die/chip, etc. where resource reservations can be made for traffic. Examples are schemes based on TDMA, rate control. The principles of the invention can also be used for related debug activities as sniffing data is a basic component thereof. Accordingly, a connection in complex circumstances (run-time, mapping present, scarce resources) on a certain system can be sniffed by a distributed system of probes and reconstruction of the connection data at a central destination point (MSA).

The above described solution guarantees a distributed sniffing of a connection and the distribution of bandwidth required for sniffing that connection into multiple lower bandwidth connections, depending on the number of available probes. Furthermore, the reconstruction of the original (sniffed) connection information at the monitoring service access point MSA now received from multiple (distributed) probes. This is in particular advantageous as a working solution in the case of bandwidth constrains on certain links is provided, due to physical limitations of links or mapping of connections. Furthermore, this solution is supported by the existing AEthereal NoC infrastructure and probing techniques.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. In the device claim enumerating several means, several of these means can be embodied by one and the same item of hardware. The mere fact that certain measures are recited in mutually different dependent claims does not indicate that a combination of these measures cannot be used to advantage.

Furthermore, any reference signs in the claims shall not be construed as limiting the scope of the claims.

The invention claimed is:

1. An electronic device, comprising:

a plurality of processing units, a network-based interconnect coupling the plurality of processing units for enabling a first communication path between a first processing unit and a second processing unit in the plurality of processing units, a monitoring services access unit, at least one first monitoring unit and at least one second monitoring unit for monitoring data traffic of the first communication path between the plurality of processing units and for forwarding monitoring results at least temporarily via at least two separate second communication paths to the monitoring service access unit, wherein the at least one first monitoring unit and the at least one second monitoring unit are arranged at separate locations along the first communication path, and a plurality of network interfaces, wherein each network interface in the plurality of network interfaces is in electronic communication with a corresponding processing unit in the plurality of processing units, wherein the at least one first and the at least one second monitoring units are in electronic communication with a network interface in the plurality of network interfaces to forward their monitoring results via the at least two second communication paths to the monitoring service access unit, wherein a network interface in the plurality of network interfaces comprises at least two buffers for buffering data from the at least two separate second communication paths and a combination unit for combining data from the at least two buffers, wherein the combination unit combines data from the at least two buffers based on a schedule that is in synchronization with the respective monitoring of data traffic by the at least one first monitoring unit and the at least one second monitoring unit.

2. The electronic device according to claim 1, wherein the monitoring results of each of the at least one first monitoring unit and the at least second monitoring unit which are forwarded to the monitoring service access unit using said at least two separate second communication paths constitute a partial monitoring result, wherein the combined monitoring results from each of the at least one first monitoring unit and the at least second monitoring unit constitute the overall monitoring result.

3. The electronic device according to claim 1, wherein the first communication path and/or the at least two separate second communication paths are determined by a static routing or a dynamic routing depending on a traffic load of the network-based interconnect.

4. The electronic device according to claim 1, wherein the monitoring service access unit comprises a combination unit for combining data traffic from the at least two communication paths.

5. The electronic device according to claim 1, wherein the monitoring service access unit comprises a combination unit for combining data traffic from the at least one first monitoring unit and the at least one second monitoring unit.

6. The electronic device according to claim 1, wherein the combination unit combines data from the at least two buffers based on a schedule that is in the dimensions of space, time, or content.

7. The electronic device according to claim 1, wherein the at least one first monitoring unit and the at least one second monitoring unit sniff flow control digits in the first communication path.

8. A method for monitoring data flow within an electronic device having a plurality of processing units coupled by a network-based interconnect, the method comprising:

monitoring data traffic of a first communication path between a first processing unit and a second processing unit in the plurality of processing units using at least one first monitoring unit and at least one second monitoring unit, and forwarding monitoring results from the at least one first monitoring unit and the least one second monitoring unit at least temporarily via at least two separate second communication paths, wherein the at least one first monitoring unit and the at least one second monitoring unit are arranged at separate locations along the first communication path, a plurality of network interfaces are associated with the plurality of processing units, and the at least one first monitoring unit and the at least one second monitoring unit are each coupled to a network interface in the plurality of network interfaces for forwarding their monitoring results via the at least two separate communication paths to a monitoring service access unit, wherein at least one network interface in the plurality of network interfaces comprises at least two buffers for buffering data from the at least two separate second communication paths and a combination unit for combining data from the at least two buffers, wherein the combination unit combines data from the at least two buffers based on a schedule that is in synchronization with the respective monitoring of data traffic by the at least one first monitoring unit and the at least one second monitoring unit.

9. The method according to claim 8, further comprising the step of combining the forwarded monitoring results to get an overall monitoring result.

10. The method according to claim 8, wherein the combination unit combines data from the at least two buffers based on a schedule that is in the dimensions of space, time, or content.

11. The method of claim 8, wherein the monitoring comprises sniffing flow control digits in the first communication path.

* * * * *